No. 831,341. PATENTED SEPT. 18, 1906.
J. B. HATTEN & W. S. BURRIS.
VEHICLE SHAFT RAISER.
APPLICATION FILED SEPT. 28, 1905.

Witnesses
F. C. Gibson.
L. B. Bridges.

Inventors
John Brenton Hatten
William S. Burris
By Davis & Davis
his Attorneys

UNITED STATES PATENT OFFICE.

JOHN BENTON HATTEN AND WILLIAM S. BURRIS, OF HUNTINGTON, WEST VIRGINIA.

VEHICLE-SHAFT RAISER.

No. 831,341.

Specification of Letters Patent.

Patented Sept. 18, 1906.

Application filed September 28, 1905. Serial No. 280,516.

*To all whom it may concern:*

Be it known that we, JOHN BENTON HATTEN and WILLIAM S. BURRIS, citizens of the United States of America, and residents of Huntington, county of Cabell, State of West Virginia, have invented certain new and useful Improvements in Vehicle-Shaft Raisers, of which the following is a full and clear specification, reference being had to the accompanying drawings, in which—

Figure 1:
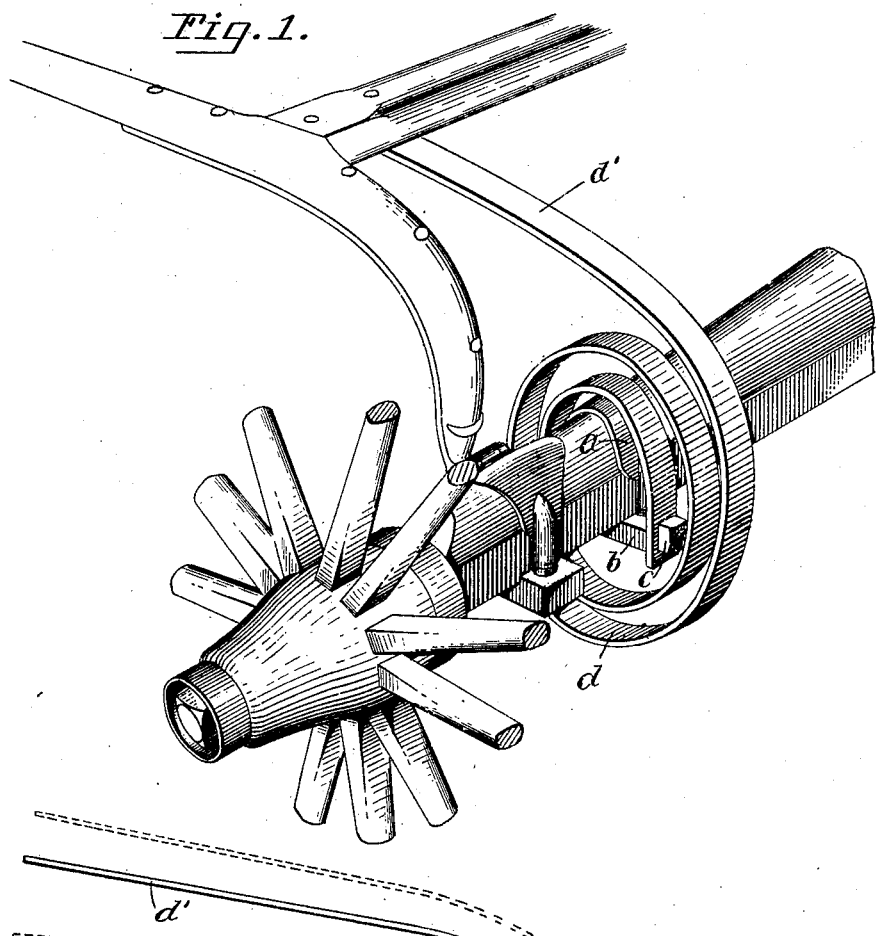
Figure 2:
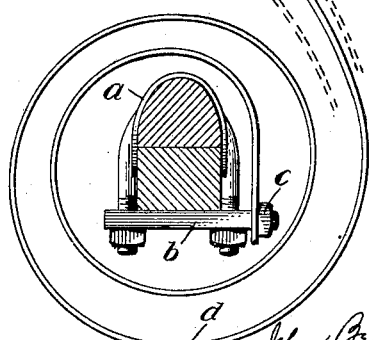

Figure 1 is a perspective view showing our device applied to vehicle-shafts of the ordinary construction; and Fig. 2, a side elevation thereof, showing the manner in which the shafts may be brought down for hitching up.

The object of this invention is to provide simple means for automatically raising and holding up the shafts when they are released from the harness, so that normally they will be out of the way, as more fully hereinafter set forth.

To the accomplishment of this object and such others as may hereinafter appear the invention consists of the parts and combination of parts hereinafter fully described, and particularly pointed out in the appended claims, reference being had to the accompanying drawings, forming a part of this specification, in which the same reference characters designate like parts throughout both the views.

Referring to the drawings by reference characters, *a* designates a clip of the ordinary construction which is adapted for attachment to the front axle of the vehicle in the same manner as the thill-couplings are. The cross-bar *b* of this clip, which is clamped up against the under side of the axle, is extended rearwardly and reduced in diameter and threaded to form an extension-bolt, on which is screwed a nut *c*. This nut *c* clamps the inner end of a convolute spring *d*, which curves upwardly over the clip and then around the axle one or more times and has its free end *d'* extended forwardly over the axle and rigidly attached to the under side of the cross-bar of the shafts. Two of these springs are employed, one being atached to the axle near each thill-coupling. The tendency of the springs is to unwind after the manner of a clock-spring, so that the shafts will be normally swung up to an upright position, where they will be out of the way.

It will be observed that our device is adapted for attachment to a great variety of styles and sizes of vehicles, inasmuch as the attaching-clips may be secured to the axle at various points, and the loose coils permit of ample adjustment of the extension *d'* forwardly and backwardly as well as laterally. It will be observed, also, that there are no loose parts, as the connection to the axle and to the shafts is rigid, thereby entirely avoiding wear and noise. It will be seen, further, that our device is not dependent for attachment to the vehicle upon any peculiar construction of the thill-couplings, as the thill-couplings are not depended upon in any way to secure the device in position.

Having thus fully described our invention, what we claim, and desire to secure by Letters Patent, is—

1. In combination with a vehicle and shafts coupled thereto, of an elevating device consisting of a convolute spring coiled around the axle and having its inner end detachably but rigidly connected directly to the axle and its outer end extended forwardly and rigidly attached to the shafts, substantially as set forth.

2. In combination with a vehicle-axle and shafts coupled thereto, of an elevating device consisting of a clip rigidly but adjustably attached directly to the axle, a convolute spring coiled around the axle and having its inner end attached to the clip and its outer end extended forwardly and attached to the cross-bar of the shafts, for the purposes set forth.

3. In combination with a vehicle-axle and shafts coupled thereto, of an elevating device consisting of a clip rigidly but adjustably attached directly to the axle, a convolute spring coiled around the axle and having its inner end rigidly attached to the rear end of the clip and its outer end extended forwardly and rigidly attached to the cross-bar of the shafts, for the purposes set forth.

In testimony whereof we hereunto affix our signatures, in the presence of two witnesses, this 26th day of September, 1905.

JOHN BENTON HATTEN.
WILLIAM S. BURRIS.

Witnesses:
S. C. HERMEN,
C. T. TAYLOR.